(No Model.)
J. B. WOLF.
APPARATUS FOR REPAIRING PNEUMATIC TIRES.
No. 581,641. Patented Apr. 27, 1897.
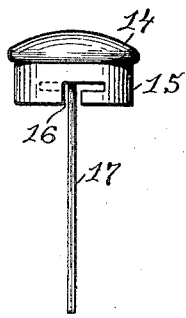
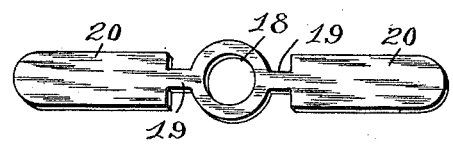
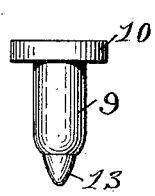
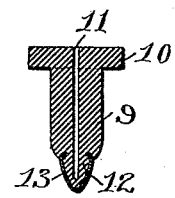
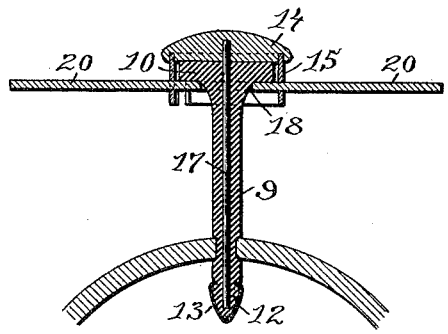
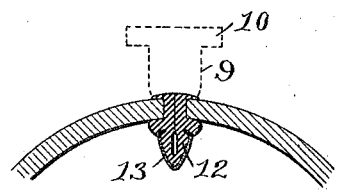
WITNESSES:
M. F. Bligh.
Chas. H. Luther Jr.
INVENTOR:
Julian B. Wolf,
By Joseph A. Miller & Co.
Attys.

UNITED STATES PATENT OFFICE.

JULIAN B. WOLF, OF PROVIDENCE, RHODE ISLAND, ASSIGNOR OF ONE-HALF TO BENNO WOLF, OF SAME PLACE.

APPARATUS FOR REPAIRING PNEUMATIC TIRES.

SPECIFICATION forming part of Letters Patent No. 581,641, dated April 27, 1897.

Application filed May 29, 1896. Serial No. 593,584. (No model.)

*To all whom it may concern:*

Be it known that I, JULIAN B. WOLF, of the city of Providence, in the county of Providence and State of Rhode Island, have invented an Improvement in Apparatus for Repairing Pneumatic Tires; and I hereby declare that the following is a full, clear, and exact description of the same, reference being had to the accompanying drawings, forming part of this specification.

This invention has reference to repairing pneumatic wheel-tires, when the same have been punctured, by inserting a plug into the hole formed by the puncturing of the tire.

The object of this invention is to provide a plug that can be readily inserted into the punctured tire, so as to close the hole and repair the tire.

The invention consists in the peculiar and novel construction of the plug and the device by means of which it can be readily inserted, as will be more fully set forth hereinafter.

Figure 1 is a side view of the stretching-button and skewer. Fig. 2 is a perspective view of the stretching-bar used in connection with the button and skewer. Fig. 3 is a side view, and Fig. 4 a vertical sectional view, of the rubber plug. Fig. 5 is a side view, enlarged, and Fig. 6 a top view, of the enlarged metal tip used on the rubber plug. Fig. 7 is a vertical sectional view of the extended plug inserted into the tire. Fig. 8 is a sectional view of part of a pneumatic tire in which a punctured hole is closed by my improved plug.

Similar numerals of reference indicate corresponding parts in all the figures.

The method consists in stretching out a rubber plug lengthwise, so that it can be readily entered into the hole which has been punctured in the pnumatic tire, and securing the rubber plug by allowing the same to contract in length, whereby it will expand laterally and fill the hole in the tire. To accomplish this, I use a rubber plug perforated nearly to the tip, as is shown in Figs. 3 and 4, in which 9 indicates the body of the plug, 10 a projecting flange on the upper end, and 11 a hole extending nearly to the end of the tip 12. This tip is covered with the light, preferably metal, cover 13.

The device for extending and inserting the plug consists of the button 14, provided with the annular rim 15, in which are formed the bayonet-slots 16. On opposite sides to the center of the button is secured the wire skewer 17, having a blunt end. The stretching-bar consists of the ring 18, connected by the arms 19 19 to the bars 20 20.

To extend the plug lengthwise and thereby contract its diameter, the plug is inserted into the ring 18 of the stretching-bar. The skewer 17 is now inserted into the hole 11 in the plug and pushed down until all the parts assume the positions shown in Fig. 7. When the arms 19 19 have entered the slots 16, a partial turn of the button secures the button to the stretching-bar and holds the plug in the extended position, as shown in Fig. 7.

The metal covering 13 of the tip 12 prevents the penetration of the skewer through the end of the plug and facilitates the entering of the plug into the puncture. Before the extended plug is entered into the hole I prefer to cover it with a naphtha or other rubber cement, and when entered the button is turned to release the cap 14 from the stretching-bar and the plug is allowed to gradually contract lengthwise, whereby it is expanded sidewise. The projecting plug is now cut off, as indicated in Fig. 8, and the sectioned portion is firmly held in the tire.

The device and a number of plugs can be carried by a bicycle-rider and punctures readily repaired in a short time.

Having thus described my invention, I claim as new and desire to secure by Letters Patent—

1. The devices for inserting the rubber plug into a tire, consisting of the stretching-bar having the ring 18 and arms 19 19 connecting the ring with the bars 20 20, and the button 14 provided with the rim 15 having the bayonet-slots 16 16 and the central skewer 17, as described.

2. A plug, adapted for repairing punctured tires, consisting of the tubular body 9, the flange 10, the tip 12 with the metallic covering 13, and provided with the axial hole 11 adapted for the reception of a skewer, whereby the plug may be extended lengthwise to facilitate its entrance into the puncture, as described.

In witness whereof I have hereunto set my hand.

JULIAN B. WOLF.

Witnesses:
JOSEPH A. MILLER, Jr.
M. F. BLIGH.